United States Patent [19]

Harrold

[11] Patent Number: 4,483,893
[45] Date of Patent: Nov. 20, 1984

[54] FUSED FLOCK SYSTEM

[75] Inventor: Stanley E. Harrold, Port Clinton, Ohio

[73] Assignee: The Standard Products Company, Cleveland, Ohio

[21] Appl. No.: 430,784

[22] Filed: Sep. 30, 1982

[51] Int. Cl.³ .............................................. B05D 1/14
[52] U.S. Cl. ..................................... 428/90; 428/296; 427/200; 427/206; 427/374.1; 427/374.4; 427/375
[58] Field of Search .................. 427/26, 200, 206, 375, 427/374.1, 374.4; 428/90, 296

[56] References Cited

U.S. PATENT DOCUMENTS

| | | |
|---|---|---|
| 2,097,233 | 10/1937 | Meston . |
| 2,173,032 | 9/1939 | Wintermute . |
| 2,334,648 | 11/1943 | Ransburg et al. . |
| 2,358,138 | 9/1944 | Blanchard et al. . |
| 2,358,227 | 9/1944 | Hiers . |
| 2,389,657 | 11/1945 | Faris et al. . |
| 2,447,374 | 8/1948 | Smyser . |
| 2,528,087 | 10/1950 | Schoepe . |
| 2,602,418 | 7/1952 | Paasche . |
| 2,706,963 | 4/1955 | Hug . |
| 2,715,074 | 8/1955 | Hirschberger . |
| 2,889,805 | 6/1959 | Freeder . |
| 3,218,184 | 11/1965 | Lemelson . |
| 3,255,730 | 6/1966 | Grohl . |
| 3,337,908 | 8/1967 | Nelson, Jr. et al. . |
| 3,342,415 | 9/1967 | Point . |
| 3,347,469 | 10/1967 | Ross et al. . |
| 3,359,944 | 12/1967 | Quackenbush et al. . |
| 3,370,569 | 2/1968 | Runge . |
| 3,379,175 | 4/1968 | Spencer . |
| 3,637,135 | 1/1972 | Luderer et al. . |
| 3,765,922 | 10/1973 | Chisholm . |
| 3,889,636 | 6/1975 | Smith . |
| 3,956,553 | 5/1976 | Palmer et al. .......................... 428/90 |
| 3,959,434 | 5/1976 | Squier ..................................... 428/90 |
| 4,201,810 | 5/1980 | Higashigachi ....................... 427/206 |
| 4,424,250 | 1/1984 | Adams et al. ........................ 428/296 |

Primary Examiner—Shrive P. Beck
Attorney, Agent, or Firm—Harness, Dickey & Pierce

[57] ABSTRACT

A technique for forming and applying a coated and fused flock material on an article is disclosed wherein a coating material and the flock material filaments are fused together on a predetermined surface of a substrate in order to form a decorative, low-friction, or wear-resistant surface. The flock material may be secured to the substrate and the coating applied thereto before fusing the coating material and flock material filaments simultaneously. Alternatively, the flock material may be pre-fused prior to the application of the coating material, followed by a fusing of the coating material and the pre-fused flock material. The coating material is preferably a thermosetting resin, but a thermoplastic coating material may alternatively used.

18 Claims, 3 Drawing Figures

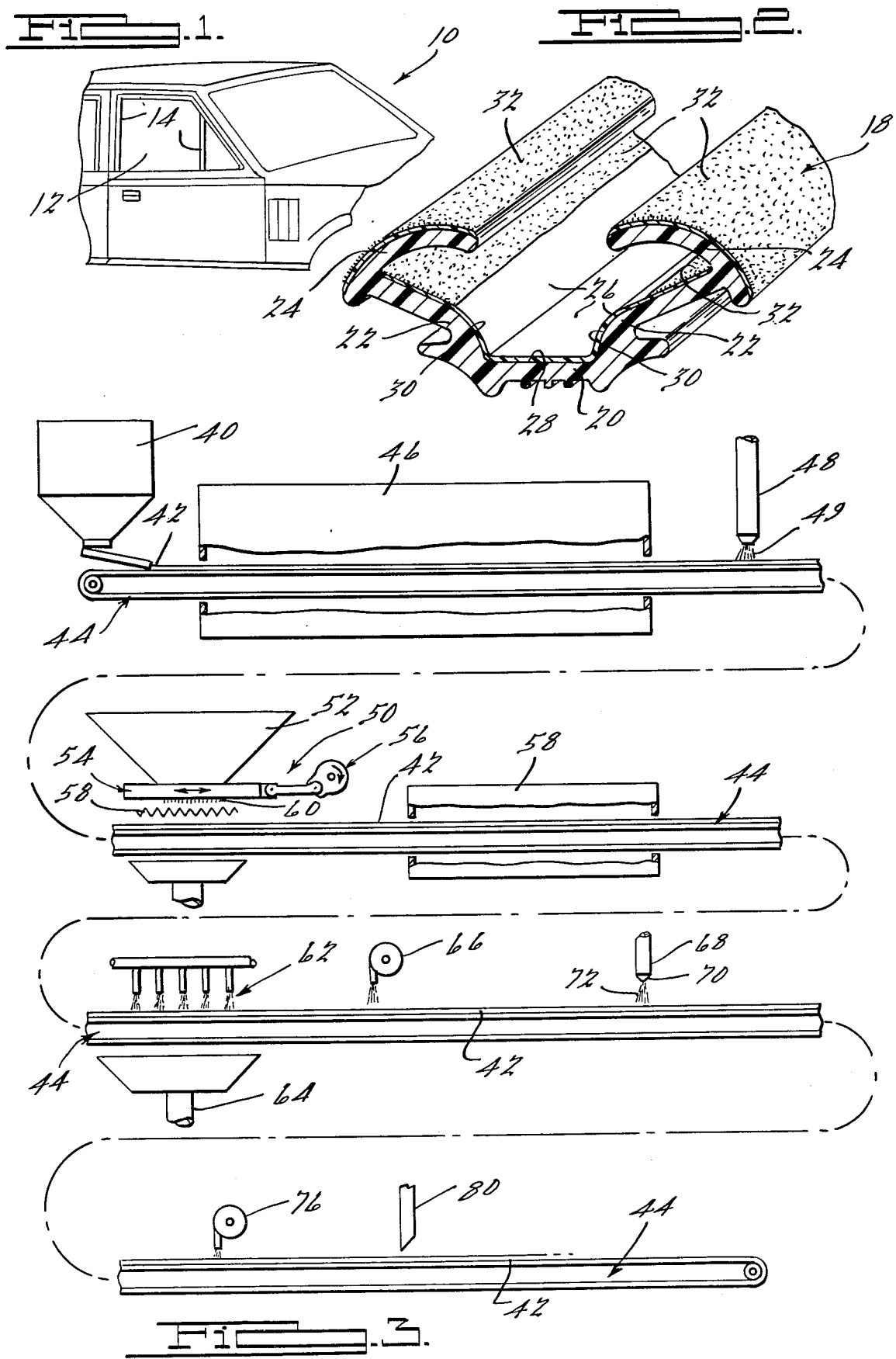

FUSED FLOCK SYSTEM

BACKGROUND AND SUMMARY OF THE INVENTION

The invention relates generally to the manufacture of flocked articles and more particularly to such articles wherein at least a portion of the flocking material is fused together.

It is frequently desirable to secure filaments or strands of flock material to an article or member in order to change its surface characteristics. Such flocked material may, for example, by applied to such an article in order to provide a decorative appearance, reduce the surface friction when the article slidingly engages another article or member, increase the article's wear-resistance or otherwise protect one or more of its surfaces.

One example of such an application of flocked material is a generally channel-shaped elastomeric trim member on the edge of vehicle glass window in which the glass slidably moves as it is raised or lowered. It has been found that conventional techniques for securing the flock material to the trim member have been largely ineffectual in certain applications. Thus, when the flocked material comes off the trim member, the low-friction and wear-resistant properties of the trim member are lost. As a result, the need has arisen for a method of applying flocked material to a substrate member such that the desirable characteristics gained from the application of the flock material are retained in heavy duty or other applictions.

According to the present invention, a substrate material is formed and a plurality of filaments of flock material are secured to one or more surfaces of the substrate material. A thermoplastic coating material is applied to at least the outer portion of the filaments of flock material, and the flock material and coating material are heated to a temperature sufficient to fuse the flock material and coating material together. Preferably, the coating material is applied to the filaments of flock material prior to the application of heat so that the coating material and flock material are fused simultaneously. Alternatively, however, the flock material may be heated to fuse adjacent filaments of the flock material prior to the application of the coating material. In such a case, the coating material and the previously fused filaments are again heated to fuse them together.

Additional advantages and features of the invention will become apparent from the following description and the appended claims, taken in conjunction with the accompanying drawings.

BRIEF DESCRIPTION OF THE DRAWINGS

FIG. 1 is a partial perspective view of an automobile body assembly employing an exemplary flocked trim member according to the present invention.

FIG. 2 is an enlarged detail view of a portion of the trim member on the automobile shown in FIG. 1.

FIG. 3 is a schematic representation of the method by which the flocked trim member of FIG. 2 is applied and fused.

DETAILED DESCRIPTION OF THE PREFERRED EMBODIMENTS

FIGS. 1 through 3 of the drawings depict exemplary embodiments of the present invention for purposes of illustration only. One skilled in the art will readily recognize from the following discussion that the principles of the invention are equally applicable to the fused flocking of articles other than the exemplary vehicle trim member shown in the drawings as well as to trim members of other types and configurations than that shown in the drawings.

Referring to FIGS. 1 and 2, an exemplary vehicle 10 includes a window glass panel 12, which may be slidably raised or lowered in a frame assembly 14. The frame assembly 14 includes a generally channel-shaped trim member 18 slidably engaged by the window glass panel 12 as it is raised and lowered.

The exemplary trim member 18 includes a channel portion 20 having a pair of outwardly diverging leg portions 22 with arcuate flanges 24 on their outer ends. A layer of fused flock material 26 is deposited on an inner base surface 28 and a pair of inner side wall surfaces 30. The layer of fused flock material 26 provides a low-friction, wear-resistant, surface of a generally channel-shaped configuration for protecting and preserving the elastomeric trim member 18 and for slidably receiving the window glass panel 12 as it is raised and lowered in the vehicle frame assembly 14. The fused flock material 26 is formed on vehicle trim member 18 according to the method described below. It should be noted that although FIG. 2 shows non-fused flock material 32 on the outer surfaces of the arcuate flanges 24 for decorative purposes, such flock material 32 may also be fused if desirable in a particular application.

FIG. 3 schematically illustrates the method by which the trim member 18 of FIG. 2 is formed with a coated and fused flock material on the inner base surface 28 and the inner side wall portions 30 of the trim member 18. One skilled in the art will readily recognize from the following discussion that the method schematically illustrated in FIG. 3 is also applicable for applying a layer of coated and fused flock material to substrate members other than trim member 18.

In FIG. 3, an extrusion apparatus 40 of a type well-known to those skilled in the art forms a substrate 42 of the desired cross-sectional shape and continuously deposits the substrate on a conveyor apparatus 44. The formed substrate 42 passes through a substrate curing oven 46 where it is cured and hardened. It should be noted that although the method depicted in FIG. 3 is especially well suited for applying a coated and fused flock material layer on an elastomeric substrate member, the substrate may be composed of any of a variety of elastomeric or non-elastomeric materials, even including, for example, wood or metal.

After the substrate has been formed, the conveyor apparatus 44 passes the substrate to a location where an adhesive applicator 48 deposits an adhesive 49 on preselected surfaces of the substrate. The adhesive 49 may be any of a number of well-known adhesives that are suitable for bonding the particular flock material being used to the material of which the substrate is composed.

Once the adhesive has been applied to the substrate, a flock depositing apparatus 50 deposits small filaments or strands of flock material 60 on to the adhesive-coated substrate. The flock depositing apparatus 50, which may comprise any of a number of known devices, preferably includes a hopper 52 for receiving bulk flock material, a sifting mechanism 54 reciprocatingly moveable by means of a sifting drive apparatus 56, and an electrostatic charging device 57 for imparting an electrostatic charge to the filaments or strands of the flock material. The electrostatic charge imparted to the flock filaments facilitates their application to the adhesive-coated substrate in a continuous flow and over a uniform filament distribution. The flocked substrate is then passed through an adhesive curing oven in order to cure the adhesive and secure the flock material 60 to the substrate 42.

The flocked substrate is next thoroughly cleaned by means of a washing apparatus 62 which applies a water or water-based cleaning solution both to the surface of the substrate 42 and to the flock material in order to prepare it for coating and fusing. The flocked substrate is then dried preferably by means of a dryer 66.

After the flocked substrate has been cleaned and dried, a coating applicator 68 deposits a coating material 72, preferably through a coating nozzle 70, on preselected surfaces of the flocked substrate. The coating material and flock material filaments are then fused by means of the application of heat from a hot air gun 76. It should be understood, however, that other suitable heat-applying means may alternatively be used.

In the preferred method of the present invention, the coating material is preferably composed of a thermosetting resin, such as, for example, an epoxy resin. When the hot air gun 76 discharges heated air at temperatures of approximately 1800° F., for example, the curing of the coating material 72 is enhanced or accelerated by the application of heat, and simultaneously the preferred thermoplastic flock material filaments are at least partially melted or softened, such that when allowed to cool, the coating material and the flock material filaments are fused. Alternatively, however, a thermoplastic coating material may be applied to the flock material filaments in a heated liquid form at a temperature sufficient to cause localized melting of at least portions of the flock material filaments, such that when cooled, the thermoplastic coating material and thermoplastic flock material are hardened and fused. In such alternate process, a heat-applying means, such as the hot air gun 76, may not be necessary unless it is found that supplemental heating of the coating material and flock material filaments is necessary to obtain the desired degree of melting and fusion.

In still another alternate embodiment of the invention, the flock material filaments 60 may be secured to the substrate 42 by the adhesive 49 as described above. The uncoated flock material may then be heated by a heat source such as the dryer 66 to cause localized melting of portions of the filaments in order to fuse the filaments together. Subsequently, one of the above-described coating materials may be applied to the previously fused filaments of flock material 60, followed by an application of heat from the hot air gun 76 in order to fuse the coating material to the pre-fused flock material filaments. In another variation of this alternate embodiment of the invention, a thermoplastic coating material may be applied in a heated liquid form, as described above, to partially melt the pre-fused flock material filaments and the coated pre-fused filaments may be allowed to cool in order to fuse the coating material to the filaments.

Finally, as illustrated in FIG. 3, a cutting blade 80 may be used to sever the finished substrate, with the coated and fused flock material attached, into predetermined lengths suitable for use in the intended application.

The foregoing discussion discloses and describes merely exemplary embodiments of the present invention. One skilled in the art will readily recognize from such discussion that various changes, modifications and variations may be made therein without departing from the spirit and scope of the invention as defined in the following claims.

What is claimed is:

1. A method of forming flocked articles, comprising sequentially:
    forming a substrate material;
    applying an adhesive to at least portions of a surface of said substrate material; securing a plurality of filaments of flock material to said surface of said substrate material;
    fusing at least a portion of adjacent filaments of flock material to each other by heating said portion of adjacent filaments to a temperature sufficient to at least partially melt said portion of adjacent filaments; and then
    allowing said portion of adjacent filaments to cool.

2. A method according to claim 1, wherein said fusing step includes applying a coating material to said filaments of flock material, and simultaneously fusing said coating material and said filaments.

3. A method according to claim 1, wherein said fusing step includes applying a coating material to said filaments of flock material and subsequently heating and then cooling said coating material and said filaments.

4. A method according to claim 3, wherein said securing step includes orienting said filaments in an outwardly-protruding relationship relative to said substrate material, at least outer portions of said filaments being coated with said coating material and fused during said fusing step.

5. A method according to claim 4, further comprising cutting said substrate material with said coated and fused flock material thereon to predetermined lengths.

6. A method according to claim 1, wherein said fusing step includes pre-fusing said filaments, applying a coating material to said pre-fused filaments, and subsequently fusing said coating material to said pre-fused filaments.

7. A method according to claim 6, wherein said fusing step includes heating said filaments to pre-fuse them and heating said coated pre-fused filaments in order to fuse said coating material and filaments.

8. A method according to claim 7, further comprising cutting said substrate material with said fused flock material and coating material thereon to predetermined lengths.

9. A channel-shaped elastomeric trim member made in accordance with the method of claim 1.

10. A method of forming flocked articles, comprising sequentially:
    forming a substrate material;
    applying an adhesive material to said substrate material;
    applying a plurality of filaments of flock material to a surface of said substrate material over said adhesive material;
    curing said adhesive material to bond said filaments to said substrate material;
    applying a coating material to at least a portion of said filaments;
    fusing said coating material and said portion of said filaments by heating said coating material and said portion of said filaments to a temperature sufficient to at least partially melt said coating material and said portion of said filaments; and then
    allowing said portion of said filaments to cool.

11. A method according to claim 10, wherein said coating material is a thermosetting resin, and fusing step including simultaneously heating said coating material and said filaments to a temperature sufficient to at least partially melt said filaments and simultaneously accelerate the curing of said resin, and then cooling said coated filaments to fuse them together.

12. A method according to claim 11, said forming step comprising extruding said substrate material into a strip having a predetermined cross-sectional configuration.

13. A method according to claim 12, further comprising cutting said substrate material with said coated and fused flock material thereon to predetermined lengths.

14. A method according to claim 10, wherein said coating material is a thermoplastic resin, said method including pre-heating said thermoplastic resin to a liquid state, said pre-heated coating material being applied to said filaments in said liquid state to heat and coat said filaments, and then cooling said coated filaments to fuse them together.

15. A method according to claim 14, further comprising supplementally heating said coated filaments.

16. A method according to claim 15, said forming step comprising extruding said substrate material into a strip having a predetermined cross-sectional configuration.

17. A method to claim 16, further comprising cutting said substrate material with said coated and fused flock material thereon to predetermined lengths.

18. A channel-shaped elastomeric trim member made in accordance with the method of claim 10.

* * * * *

UNITED STATES PATENT AND TRADEMARK OFFICE
CERTIFICATE OF CORRECTION

PATENT NO.   :   4,483,893
DATED        :   November 20, 1984
INVENTOR(S)  :   Stanley Earle Harrold It is certified that error appears in the above-identified patent and that said Letters Patent is hereby corrected as shown below:

Col. 2, line 13, "divering" should be --diverging--;

Col. 5, line 2, (Claim 11), "and" should be --said--.

Signed and Sealed this

Sixteenth Day of April 1985

[SEAL]

Attest:

DONALD J. QUIGG

Attesting Officer     Acting Commissioner of Patents and Trademarks